Dec. 2, 1969 R. K. McDONNELL 3,481,556
TURF HANDLING APPARATUS
Filed March 31, 1967 3 Sheets-Sheet 2
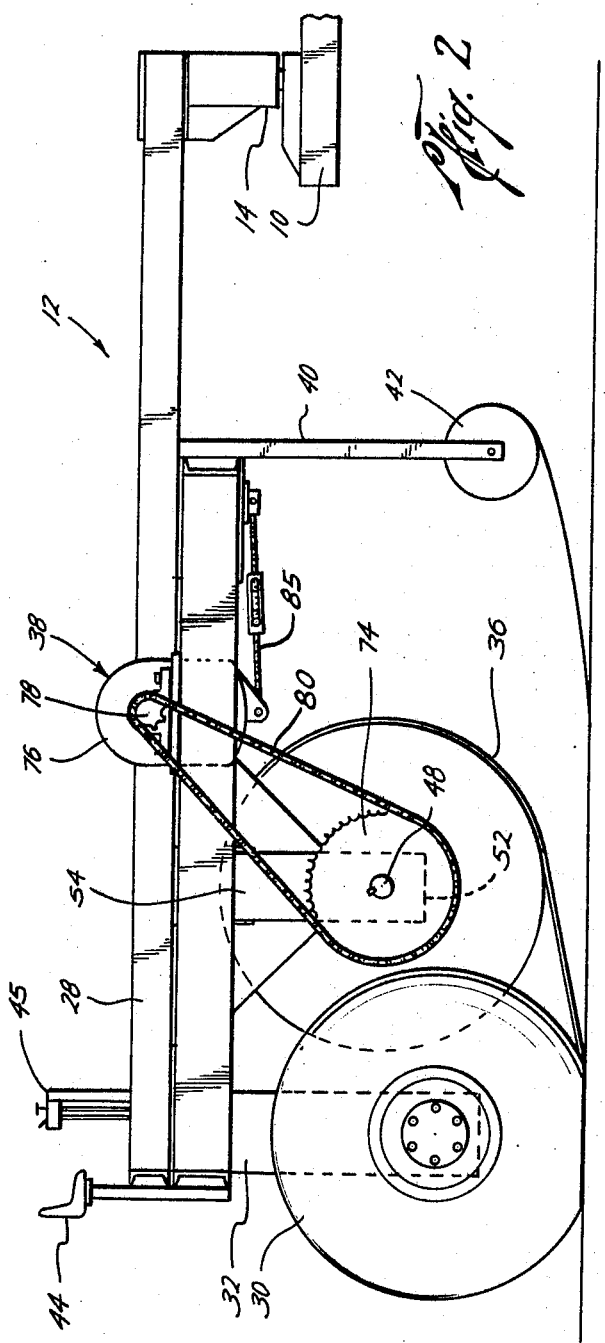
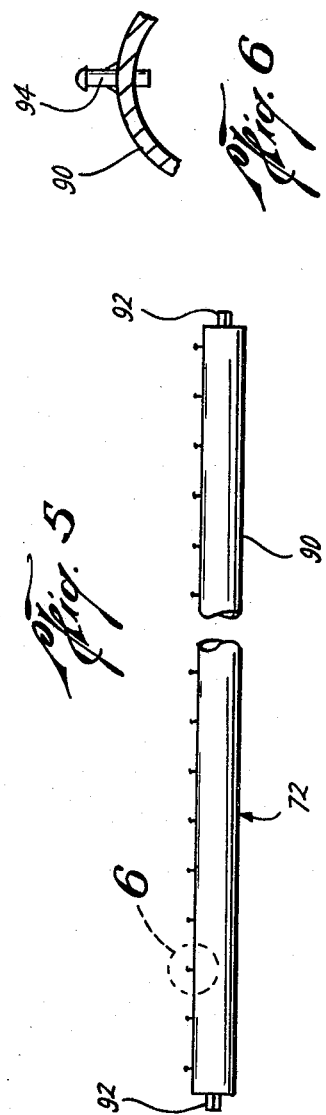
Roger K. McDonnell
INVENTOR
BY
ATTORNEY

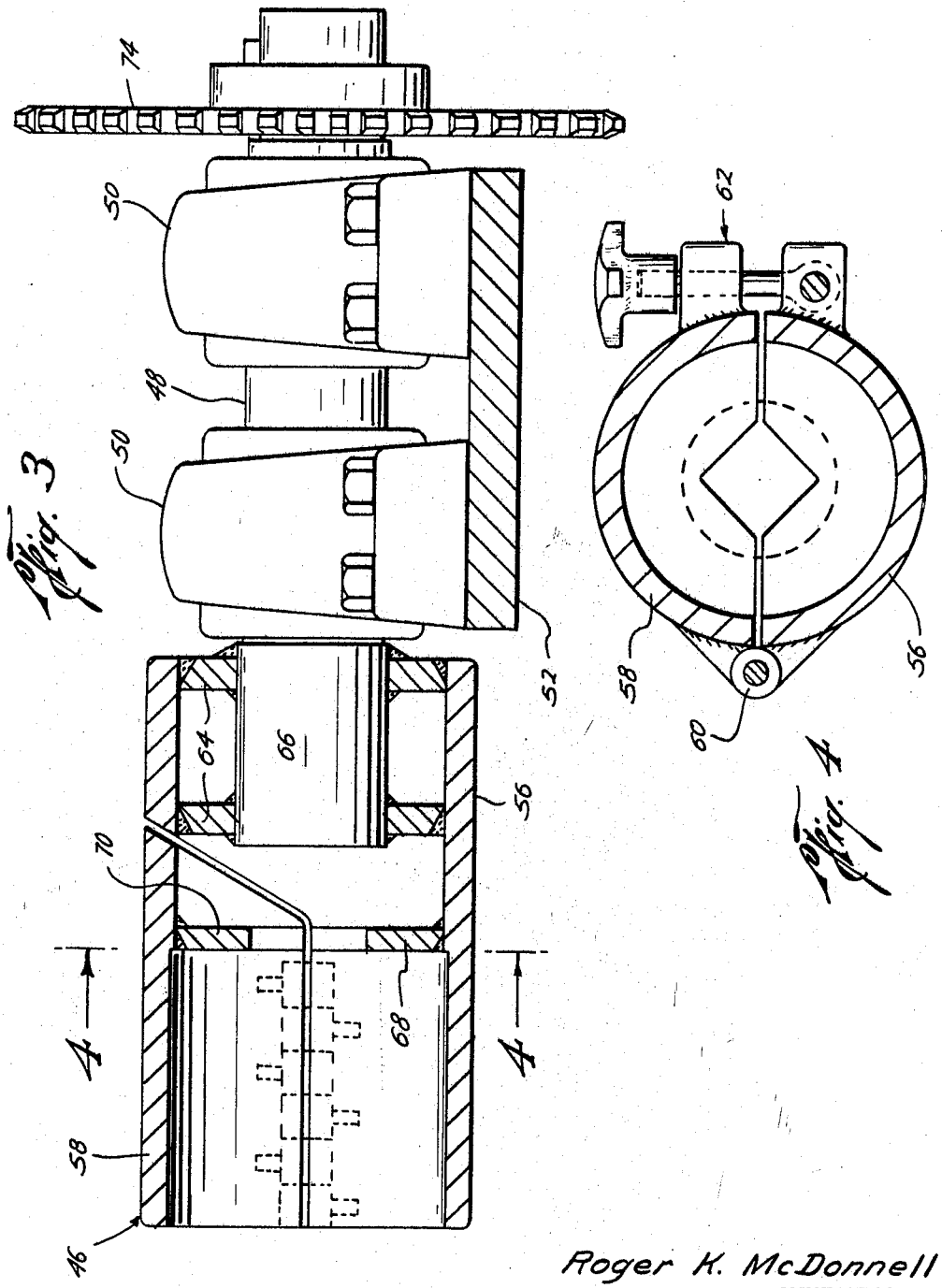

United States Patent Office 3,481,556
Patented Dec. 2, 1969

3,481,556
TURF HANDLING APPARATUS
Roger K. McDonnell, Houston, Tex., assignor to Houston Sports Association, Inc., Houston, Tex., a corporation of Texas
Filed Mar. 31, 1967, Ser. No. 627,339
Int. Cl. B65h 17/46; A01b 45/04
U.S. Cl. 242—86.52      9 Claims

ABSTRACT OF THE DISCLOSURE

An apparatus for handling, including laying and removing, strips of synthetic turf of substantial length which apparatus lays synthetic turf strips on a base surface under tension and includes means controlling the rotation of the spindle upon which the strip of synthetic turf is wound to control tension during laying and to roll the strip on the spindle during removal.

BACKGROUND OF THE INVENTION

The present invention relates to an apparatus for handling strips of material such as synthetic turf, to install and remove such strips on a base surface.

With the development of suitable synthetic turf material which has proven satisfactory as a surface covering for base surfaces such as playing surfaces, for football and baseball and other applications, an apparatus for handling such synthetic turf has been needed. The synthetic turf is produced as a strip in convenient lengths and having a width determined by the size of the production machines. Thus, to cover a playing surface, a plurality of strips must be installed with their adjacent longitudinal edges joined together. The weight and bulk of synthetic turf strips, e.g., a strip fourteen feet wide and two-hundred twenty feet long weighs approximately four thousand pounds, dictate that the strips be of limited length in comparison to most playing field dimensions and that suitable apparatus be provided for handling the strips during installation and removal.

An object of the present invention is to provide an apparatus for installing and removing a strip of synthetic turf which maintains adequate tension in the strip during installation.

Another object is to provide an apparatus for laying a strip of synthetic turf on the ground and for laying a strip of protective material under one longitudinal edge of the synthetic turf strip.

A further object is to provide an apparatus for installing and removing strips of synthetic turf capable of handling strips of substantial size and weight without disrupting the ground surface.

Still another object is to provide an apparatus for installing strips of synthetic turf to cover a playing field with such strips in a relatively short period of time.

Still a further object is to provide an apparatus for removing strips of synthetic turf from a playing field which winds each strip in a roll on a spindle whereby the strip is easily stored and is ready for subsequent installation.

BRIEF DESCRIPTION OF THE DRAWINGS

These and other objects and advantages of the present invention are hereinafter set forth and described in relation to the preferred apparatus illustrated in the drawings and wherein:

FIGURE 2 is a partial elevation view of the equipment shown in FIGURE 1.

FIGURE 3 is a detail elevation view partly in section illustrating the spindle bearings and the split spindle socket attached thereto.

FIGURE 4 is a detail sectional view taken along line 4—4 in FIGURE 3.

FIGURE 5 is an elevation view of a spindle.

FIGURE 6 is a detail elevation view taken in the area designated 6 in FIGURE 5 to illustrate the anchoring means provided on the spindle.

DESCRIPTION OF THE PREFERRED EMBODIMENT

Figure 1:
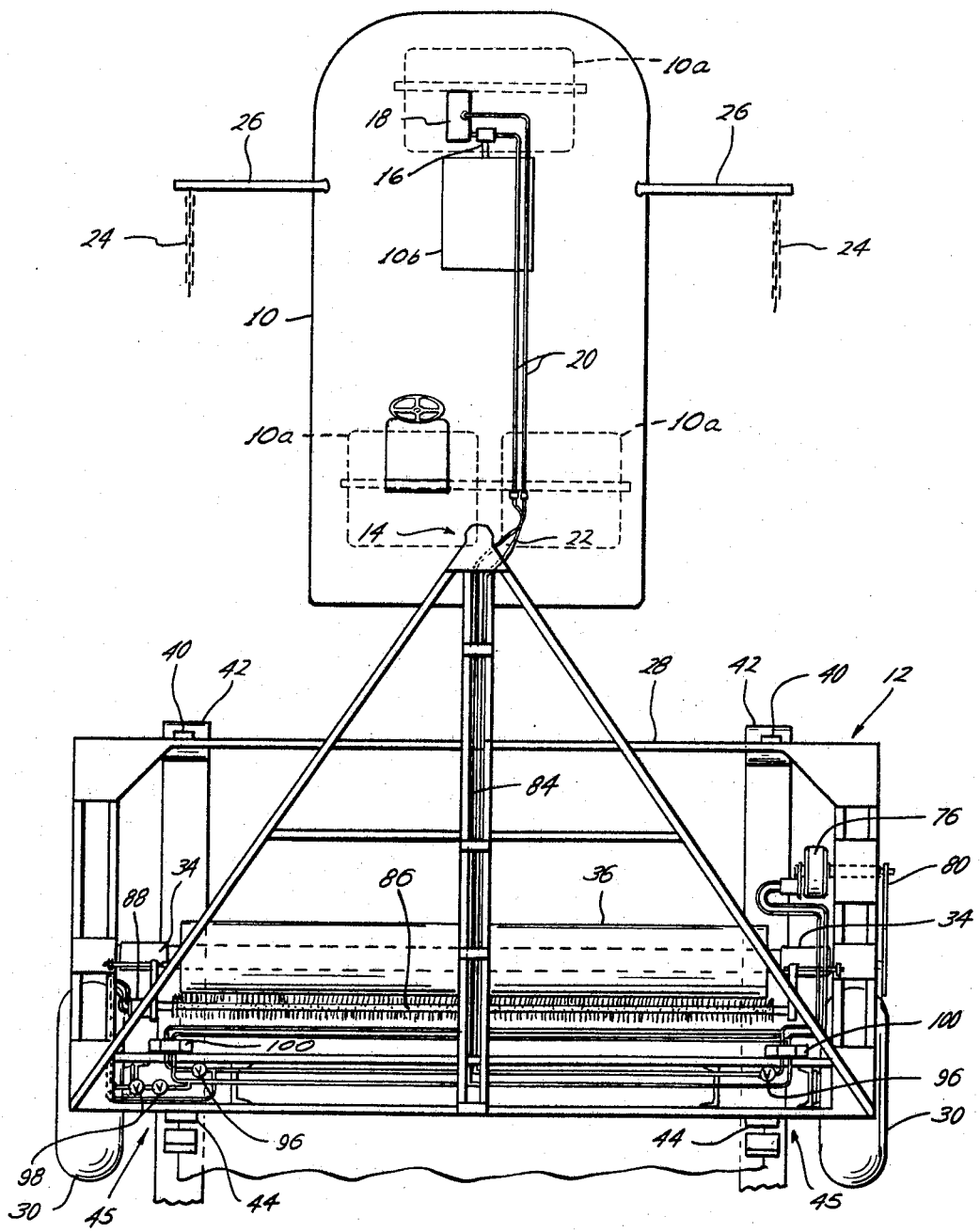
FIGURE 1 is a plan view of the apparatus in position for installing the initial strip of synthetic turf.

The apparatus used for handling strips of synthetic material, as shown in FIGURE 1, includes the tractor 10 and the trailer 12 which is connected to the tractor 10 by a suitable hitch 14. It is preferred that the tractor be of a type having oversized low pressure tires or rollers 10a, such as is commonly used in loose sand and marshes so that the weight of the tractor supported on the tires or rollers as it rolls over a surface to be covered with synthetic turf strips, is distributed over a sufficiently large area that it does not cause indentations on or disruption of such surface and to allow the tractor to be used on the synthetic turf strips without damaging the turf fibers. The tractor 10 includes the usual engine 10b, steering wheel, brake, accelerator and gear shift for controlling the speed and direction of movement of the tractor and also a hydraulic system such as the hydraulic fluid pump 16 and the hydraulic fluid reservoir 18. The hydraulic lines 20 extend from the tractor 10 to the trailer 12 and are provided with suitable flexible sections 22 connecting from the tractor to the trailer to allow for relative movement therebetween. Guide chains 24 are supported from the tractor 10 by the brackets 26 and are positioned within the field of vision of a person driving the tractor 10 to assist in steering of the tractor so that one strip is laid parallel to and its longitudinal edge in abutting relationship with the longitudinal edge of a previously laid strip and also to guide the drive of the tractor into picking up the strips to assure that they are wound uniformly on a spindle.

The trailer 12 includes the frame 28, the oversized wheels 30 which are rotatably mounted on the legs 32 extending downwardly from the frame to provide rolling support for the frame, the means 34 supporting a roll 36 of a synthetic turf strip and means 38 controlling the rotation of the roll 36. The frame 28 is connected to the tractor 10 by the hitch 14. The arms 40 are secured to the frame 28 and extend downwardly therefrom to provide rolling support for the rolls 42 of edge protective material which is preferred to be a strip of material which is laid on the ground immediately under and overlapping abutting longitudinal edges of adjacent strips of synthetic turf. As shown in FIGURE 2, seats 44 are supported from the frame 28 preferably at each side of the rear portion of the trailer and approximately in line with the edge of the roll 36 to support an operator or in position to operate the controls 45 which control the means 38 for controlling rotation of the roll 36.

The roll supporting means 34 includes the split couplings 46 which are adapted to receive the ends of the spindle on which the roll 36 is wound. Each split coupling 46 is connected to a shaft 48 which is rotatively supported in a bearing 50. The bearings 50 are supported on the plates 52 which are secured to the frame 28 by the depending arms 54.

As best seen in FIGURES 3 and 4, the split coupling 46 includes the tubular body 56, the outer portion of which is recessed to receive the cover 58 which is pivotally mounted to one side of the recessed portion of the tubular body 56 by the hinge 60 and adapted to be secured to body 56 by the clamp 62. The tubular body 56 is suitably secured to the shaft 48 by means such as the rings 64 and the sleeve 66 which is connected on the shaft 48 and prevented from rotation therearound by any suitable means such as a key and slot arrangement (not shown). As shown, the rings 64 are welded to the interior of the body 56 and to the exterior of the sleeve 66. The plate 68 is secured to the lower interior of the recessed portion of tubular body 56 and the plate 70 is secured on the interior of the cover 58 in position in alignment with the plate 68. The interior of the plates 68 and 70 define a square-shaped recess which is adapted to receive the square end of the spindle 72 on which the roll 36 is wound. The sprocket 74 is secured to the shaft 48 on the opposite side of the bearings 50 from the split coupling 46. The split coupling 46 which receives the other end of spindle 72 is if similar construction except that a sprocket 74 is not needed and therefore is omitted.

The means 38 controlling rotation of the roll 36 includes hydraulic motor 76 which is controlled by the controls 45 and is connected to drive the sprockets 78. The chain 80 connects the sprocket 78 to the sprocket 74, whereby the means 38 controlling rotation of the roll 36 may act as a brake or as a means for actually rotating the roll 36. The control lines 22 are connected to suitable control lines 84 mounted on the trailer 12 which connect through the controls 45 to the hydraulic motor 76. The arm 85 (FIGURE 2) connects from the frame 28 to the hydraulic motor 76 to support the motor 76 and to prevent the motor case for rotating so that all input to the motor is transmitted to the roll 36.

To clean the strip of synthetic turf as it is being removed from the ground, it is sometimes preferable to provide the brush 86 which is suitably mounted from the frame 28 and includes the hydraulic motor 88 to rotate it in engagement with the outer surface of the roll 36 as it is being wound on the spindle 72.

As shown in FIGURES 5 and 6, the spindle 72 includes a tubular body 90, having square ends 92 adapted to be received in the notch defined by the plates 68 and 70 and includes a plurality of strip engaging means. The preferred form of strip engaging means is shown in FIGURE 6 and includes rivet 94 having its shank extending through the body 90 and welded therein with its head head spaced outwardly from the exterior of the body 90. The rivets, therefore, provide suitable means to be received in reinforced holes in the ends of the strips of turf material and should be spaced along the length of spindle 72 to uniformly engage the strip and the heads of the rivets act to prevent inadvertent disengagement of the strip from the spindle.

In operation, a roll 36 of synthetic turf strip is mounted on the trailer 12 by opening the covers 58 of the tubular split couplings 46 and positioning the spindle 72 on which roll 36 is mounted in the split coupling 46 and with its square ends 92 positioned in the notch defined by the plate 68. Thereafter the covers 58 are closed and secured by the latches 62. In this position, the roll is supported on the trailer and under control of the means 38. With the roll 36 suitably mounted, the tractor 10 drives the trailer into position so that the free end of the roll 36 may be anchored in the ground. Assuming that the strip is the first strip to be installed as shown, the tractor 10 pulls the trailer in the direction in which the strip is to be laid. The ends of the protector strip from the rolls 42 are also suitably anchored under the anchored end of the strip from roll 36 so that as the tractor 10 and trailer 12 move away from the anchoring point, the protective strips are laid on the ground under the longitudinal edges of the strip of synthetic turf from the roll 36. During the unrolling of the strip 36, the controls 45 are actuated to control the motor 76 to apply a braking force to the unrolling of the roll 36. In this manner the means 38 may be used to oppose the unrolling and when used in combination with the pulling by the tractor 10 of the trailer 12, means 38 can be used to control the tension in the strip being unwound from the roll 36.

In the laying of subsequent strips of synthetic turf, it should be noted that only one of the rolls 42 will be used. In driving the tractor 10, one of the guide chains 24 is positioned on the edge of the previously laid strip of synthetic turf to assure that the strip being laid has it longitudinal edge positioned in abutting relationship with the longitudinal edge of the previously installed strip. When the laying of one of the strips is complete, it is detached from the spindle 72 and suitably anchored to the ground. Thereafter, the empty spindle 72 is removed from the split couplings 46 and the split couplings are then ready to receive the next roll 36.

The apparatus of the present invention is also suitable for removal of such strips of synthetic material. In such case, the tractor is driven to position the trailer over the strip which is to be removed at one end of the strip. The end of the strip is detached from its anchored position and mounted on the spindle. It is preferred that the tractor face in the direction of the other anchored end of the strip. When the strip is secured to the spindle mounted in the split couplings 46, the means 38 is actuated by the controls 45 to wind the strip into a roll on the spindle. If desired, and assuming that the motor 76 has sufficient power, the rotation of the spindle 72 may be used to supply the moving power moving the tractor 10 and the trailer 12 along as the strip is wound into the roll 36. It is generally recommended that sufficient tension be provided during winding of the strip on the spindle 72 so that it winds evenly and tightly. In some instances, it may be advisable to gently apply the brakes on the tractor to create the desired tension in the strip as it is being wound. The tractor guides the movement of the trailer 12 so that the strip is maintained in proper position as it is wound into the roll 36. When the trailer reaches the anchored end of the strip of synthetic turf, the anchoring is released and the remainder of the strip is wound onto the roll. Thereafter, suitable means is provided to bind the loose end of the strip on the roll; the roll is removed from the split couplings 46 and moved to a suitable storage place and a new spindle 72 is positioned in the split couplings 46. Thereafter, the tractor positions the trailer 12 in position over the released end of the next strip to be picked up or removed.

As best seen in FIGURE 1, the hydraulic system is manifolded to both sides of the rear of trailer 12. The control valves 96 are shut-off valves and are used to control which side of the trailer controls the operation of the motor 76. In addition, valves 98 are provided to control the operation of the brush motor 88. The valves 100 are suitable valves connected to the motor 76 and provide control of both the direction in which the motor 76 operates and also the mount of the output of the motor 76. Thus, the rotation of the roll 36 can be controlled both as to direction and as to the rotational force imparted thereto to maintain the desired tension in the strip as it is unwound from or wound on the spindle 72.

While the apparatus hereinbefore described as being suitable for handling strips of synthetic turf, it may be used for handling any other strip material, particularly where such strip material is to be installed to cover a base surface of substantial area, such as a playing field.

Thus, from the foregoing, it can be seen that the apparatus of the present invention is suitable for quick handling of long strips of synthetic turf and is capable of installing such strips under tension and provides for the laying of a strip of protective material under the abutting longitudinal edges of the synthetic turf strips. The apparatus distributes the weight of the roll of strip material and its own weight over a sufficient area of the ground to avoid disrupting the ground surface and damaging the turf over which it rolls. When removing the strips, the apparatus winds the strips into rolls which are suitable for storage and subsequent rapid installation by the apparatus.

The foregoing disclosure and description of the invention are illustrative and explanatory thereof, and various changes in the size, shape and materials, as well as in the details of the illustrated construction, may be made without departing from the spirit of the invention.

What is claimed is:

1. An apparatus for handling strips of synthetic turf, comprising
   a tractor having rolling support, means driving said tractor, steering means and means supplying hydraulic fluid under pressure,
   a trailer including,
   a frame,
   wheels secured to said frame and providing rolling support therefor,
   means for connecting said trailer to said tractor,
   a spindle adapted to have a strip of synthetic turf wound thereon,
   spindle supporting means mounted on said frame and adapted to support a spindle with a strip of synthetic turf wound thereon,
   a hydraulic motor operatively connected to said spindle supporting means and adapted to control rotation of said spindle,
   means establishing communication between said hydraulic fluid supply means and said hydraulic motor, and
   control means connected in said communication establishing means to control said hydraulic motor,
   said tractor when connected to said trailer being adapted to move and guide said trailer into position for laying and removing strips of synthetic turf.

2. An apparatus according to claim 1, wherein said spindle supporting means for each end of said spindle includes,
   a shaft,
   bearing means mounted to said frame and rotatively supporting said shaft, and
   a split coupling connected to said shaft and adapted to receive and clamp one end of said spindle therein.

3. An apparatus according to claim 2, wherein said split coupling comprises,
   a tubular body,
   means connecting the inner portion of said tubular body to said shaft,
   the outer portion of said tubular body being recessed,
   a cover pivotally connected to said tubular body and adapted when closed to be positioned in the recessed portion of said tubular body,
   means securing said cover to said body in said closed position, and
   coacting means on said tubular body and said cover for engaging one end of said spindle so that said spindle is mounted by said split couplings to said shafts.

4. An apparatus according to claim 1, wherein said control means includes,
   duplicate sets of controls mounted on said frame,
   one set of controls being positioned in substantial alignment with one edge of the strip being handled and the other set of controls being positioned in substantial alignment with the opposite edge of the strip being handled.

5. An apparatus according to claim 1, wherein said spindle includes,
   a body,
   a plurality of strip receiving projections secured to said body in spaced positions along its length, and
   engaging means extending from each end of said body.

6. An apparatus according to claim 5, wherein each of said strip receiving projections comprises,
   a rivet having a shank and an enlarged head,
   the shank of said rivet being secured to said body to position the head of said rivet outwardly from the exterior surface of said body.

7. An apparatus for handling strips of material, comprising
   a frame,
   wheels mounted on said frame to provide rolling support therefor,
   a first spindle,
   means for mounting said first spindle on said frame,
   means on said frame for rotating said first spindle,
   a second spindle,
   said second spindle being substantially shorter than said first spindle, and
   means for rotatively mounting said second spindle on said frame with its center portion being aligned with one of the edges of said first spindle.

8. An apparatus according to claim 7, including
   a tractor adapted to connect to said frame to move said frame,
   said tractor having rolling support means,
   said rolling support means of said tractor and said wheels supporting said frame all being of sufficient size to distribute the frame and tractor weight over a sufficiently large area so that the ground over which the tractor and frame roll is not disrupted thereby, which the tractor and frame roll is not disrupted thereby.

9. An apparatus according to claim 8, including
   at least one seat secured to said frame,
   control means for actuating said rotating means mounted on said frame in close proximity to said seat whereby said control means are operable from said seat.

References Cited

UNITED STATES PATENTS

| | | | |
|---|---|---|---|
| 1,599,769 | 9/1926 | Jaynes | 242—74 |
| 2,536,571 | 1/1951 | Sanquin et al. | 242—86.52 |
| 2,735,684 | 2/1956 | Longee et al. | 242—68 X |
| 2,856,016 | 10/1958 | Lindeman | 242—86.5 X |
| 2,941,743 | 6/1960 | Cochrane et al. | 242—74 X |
| 2,991,024 | 7/1961 | Goode | 242—86.5 |
| 3,091,413 | 5/1963 | Leithiser | 242—86.7 |
| 3,091,414 | 5/1963 | Patnaude | 242—86.52 |
| 3,112,107 | 11/1963 | Theodosiou. | |
| 3,227,390 | 1/1966 | Wendelken | 242—75.43 |
| 3,246,858 | 4/1966 | Alexeff | 242—68.4 |
| 2,912,183 | 11/1959 | Hull | 242—86.5 |
| 3,247,934 | 4/1966 | Goode | 242—86.5 X |
| 3,346,213 | 10/1967 | Nelson | 242—86.7 X |
| 3,395,485 | 8/1968 | Rooklidge | 242—86.5 X |

NATHAN L. MINTZ, Primary Examiner